(12) United States Patent
Chen et al.

(10) Patent No.: US 11,609,367 B2
(45) Date of Patent: Mar. 21, 2023

(54) LIGHT SOURCE MODULE AND DISPLAY DEVICE

(71) Applicant: Coretronic Corporation, Hsin-Chu (TW)

(72) Inventors: Hui-Chuan Chen, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 54 days.

(21) Appl. No.: 17/315,367

(22) Filed: May 10, 2021

(65) Prior Publication Data

US 2021/0364680 A1 Nov. 25, 2021

(30) Foreign Application Priority Data

May 19, 2020 (CN) .......................... 202020836074.X

(51) Int. Cl.
*G02F 1/1335* (2006.01)
*G02B 5/22* (2006.01)
*F21V 8/00* (2006.01)

(52) U.S. Cl.
CPC ........... *G02B 5/223* (2013.01); *G02B 6/0035* (2013.01); *G02F 1/133519* (2021.01); *G02F 1/133524* (2013.01)

(58) Field of Classification Search
CPC .................................................. G02F 1/133519
See application file for complete search history.

(56) References Cited

U.S. PATENT DOCUMENTS

| 10,386,678 B2* | 8/2019 | Cho ..................... G02B 6/0088 |
| 2017/0219861 A1* | 8/2017 | Fukuoka ............. G02F 1/13363 |
| 2018/0307102 A1* | 10/2018 | Ko ....................... G02B 6/0025 |

FOREIGN PATENT DOCUMENTS

| CN | 201600905 A | 1/2016 |
| CN | 201643516 A | 12/2016 |
| CN | 207424291 U | 5/2018 |

* cited by examiner

*Primary Examiner* — Edmond C Lau

(57) ABSTRACT

A light source module includes a light guide plate, a light source, a first color conversion film, at least one optical film and an ink coating. The light guide plate has a first light-emitting surface, a second light-emitting surface opposite to the first light-emitting surface, and a light-incident surface connected between the first light-emitting surface and the second light-emitting surface. The light source is disposed beside the light-incident surface. The first color conversion film is disposed beside the first light-emitting surface. The at least one optical film is disposed beside the light guide plate. The ink coating is disposed on a surface edge or an end surface of at least one of the light guide plate, the first color conversion film, and the at least one optical film, and is configured to allow light to pass therethrough. A display device of the invention is further provided.

9 Claims, 6 Drawing Sheets

180
LIGHT SOURCE MODULE AND DISPLAY DEVICE

CROSS-REFERENCE TO RELATED APPLICATION

This application claims the priority benefit of China application 202020836074.X, filed on 2020 May 19. The entirety of the above-mentioned patent application is hereby incorporated by reference herein and made a part of this specification.

FIELD OF THE INVENTION

The invention relates to a light source module, and particularly relates to a light source module that can be used in a display device and a display device using the light source module.

BACKGROUND OF THE INVENTION

At present, the liquid crystal display devices have been widely used as display components of electronic products. With the demand for lighter and thinner electronic products, the frame of the liquid crystal display device is designed to be narrower and narrower, and the light source module of the liquid crystal display device is also required accordingly to be narrower.

However, when the frame is narrowed, the frame may no longer provide the function of shielding unexpected light, so the light source module may cause light leakage or halo around the frame. White light leakage or white halo will occur around the display area when a white light emitting diode (LED) is used. Blue light leakage or white halo will occur around the display area when a blue light emitting diode (LED) is used. As a result, the image of the liquid crystal display device has a problem of blue phenomenon at the edges.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module, which can reduce the blue phenomenon of edge light leakage.

The invention provides a display device, which can reduce the blue phenomenon at the edge of the displayed image.

Other advantages and objects of the invention may be further illustrated by the technical features broadly embodied and described as follows.

In order to achieve one or a portion of or all of the objects or other objects, a light source module provided in an embodiment of the invention includes a light guide plate, a light source, a first color conversion film, at least one optical film and an ink coating. The light guide plate has a first light-emitting surface, a second light-emitting surface opposite to the first light-emitting surface, and a light-incident surface connected between the first light-emitting surface and the second light-emitting surface. The light source is disposed beside the light-incident surface. The first color conversion film is disposed beside the first light-emitting surface. The at least one optical film is disposed beside the light guide plate. The ink coating is disposed on a surface edge or an end surface of at least one of the light guide plate, the first color conversion film, and the at least one optical film, and is configured to allow light to pass therethrough.

In order to achieve one or a portion of or all of the objects or other objects, a display device provided in an embodiment of the invention includes a first display panel and the aforementioned light source module. The first display panel is disposed on a side of the first color conversion film away from the light guide plate.

In the light source module of the embodiment of the invention, an ink coating allowing light to pass therethrough is disposed on the surface edge or end surface of at least one of the light guide plate, the first color conversion film and the at least one optical film. Thus, when light exits from the edge of the light guide plate, part of the light is converted by the first color conversion film, is transmitted to the edge of the first color conversion film or the at least one optical film, and then passes through the ink coating to be converted into light of different colors. As such, the ink coating can achieve the effect of lightening the blue light when the light source emits blue light, thereby reducing the blue phenomenon of light leakage at the edge of the light source module. In addition, since the display device of the embodiment of the invention uses the above-mentioned light source module, the problem of blue edge of the displayed image can be reduced.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
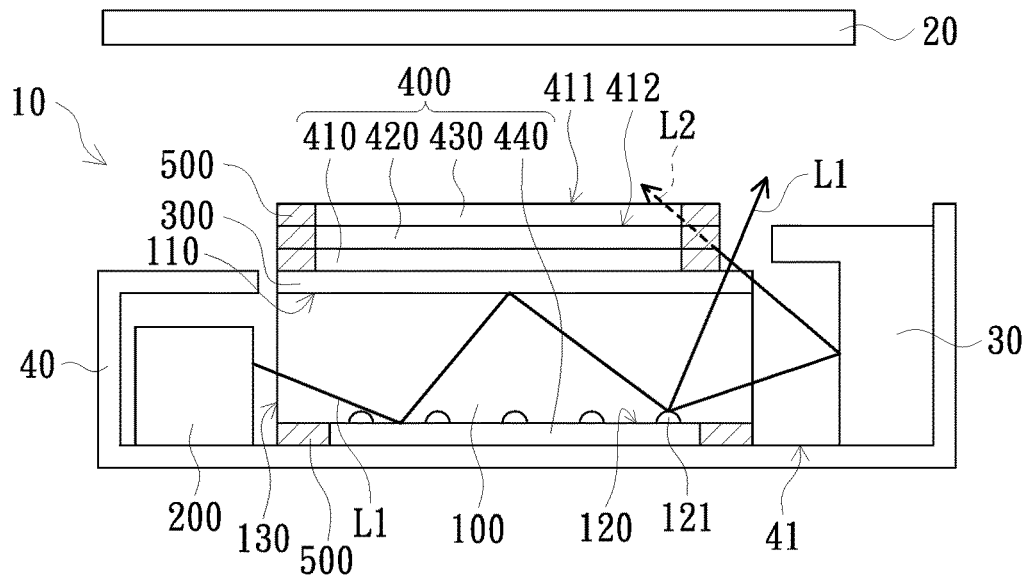
FIG. 1 is a schematic cross-sectional view of a display device according to an embodiment of the invention.

FIG. 1 is a schematic cross-sectional view of a display device according to an embodiment of the invention. Referring to FIG. 1, the display device 1 of this embodiment includes a light source module 10 and a first display panel 20. The light source module 10 includes a light guide plate 100, a light source 200, a first color conversion film 300, at least one optical film 400 and an ink coating 500. The light guide plate 100 has a first light-emitting surface 110, a second light-emitting surface 120 opposite to the first light-emitting surface 110, and a light-incident surface 130 connected between the first light-emitting surface 110 and the second light-emitting surface 120. In this embodiment, the second light-emitting surface 120 is used as the bottom surface of the light guide plate 100, that is, the main function of the second light-emitting surface 120 is not used as a light-emitting surface; but inevitably, part of the light will be emitted from the second light-emitting surface 120 during the transmission process of the light in the light guide plate 100. The second light-emitting surface 120 has, for example, a plurality of diffusing microstructures 121. The diffusing microstructures 121 may be dots or other microstructures that can diffuse light, so that the light transmitted in the light guide plate 100 can be emitted toward the first light-emitting surface 110. The light source 200 is disposed beside the light-incident surface 130 and is configured to provide light L1 to be incident on the light-incident surface 130. The first color conversion film 300 is disposed beside the first light-emitting surface 110. Specifically, the first color conversion film 300 is, for example, stacked on the first light-emitting surface 110, but is not limited thereto. The at least one optical film 400 is disposed beside the light guide plate 100, for example, is sequentially stacked on the first light-emitting surface 110 of the light guide plate 100. The ink coating 500 is configured to allow the light L1 to pass therethrough. The ink coating 500 is, for example, disposed on the surface edge or end surface of at least one of the light guide plate 100, the first color conversion film 300, and the at least one optical film 400. In this embodiment, the ink coating 500 is disposed on the end surface 413 of the at least one optical film 400. It should be noted that the surface where the ink coating is disposed in the invention refers to the plane of each related element parallel to the first light-emitting surface 110, and the end surface where the ink coating is disposed refers to the plane of each related element non-parallel (e.g., perpendicular) to the first light-emitting surface 110. The ink coating is not disposed on the light-incident surface 130 when being disposed on the end surface of the light guide plate. However, the invention does not limit the elements provided with the ink coating 500. For example, the ink coating 500 may be disposed on the surface edge or end surface of at least one of the light guide plate 100, the first color conversion film 300 and the at least one optical film 400. In particular, FIG. 1 shows the possible positions of the ink coating 500, and it does not mean that the aforementioned positions all need to be provided with the ink coating 500. In this embodiment, the first display panel 20 is, for example, disposed on the side of the first color conversion film 300 away from the light guide plate 100.

In this embodiment, the light source module 10 may further include a frame 30 and a back plate 40, for example. The light guide plate 100 is disposed in the frame 30. It should be noted that although the frame 30 in the schematic cross-sectional view of FIG. 1 is only drawn on one side of the light guide plate 100, the frame 30 in the invention is a structure surrounding at least three sides of the light guide plate 100, or a ring structure surrounding the light guide plate 100. The back plate 40 has, for example, a bearing surface 41. The light guide plate 100, the at least one optical film 400 and the frame 30 are, for example, disposed on the bearing surface 41 of the back plate 40. In order to clearly illustrate the components of the light source module 10, the light source module 10 and the first display panel 20 are drawn separately in this embodiment. The frame 30 can also be used to clamp the first display panel 20 in another embodiment, and the invention is not limited thereto.

Please continue to refer to FIG. 1. The light source 200 is, for example, a light emitting element having a plurality of point light sources (not shown). The point light source is, for example, a light emitting diode. Specifically, the light emitting diode is a grain-level nitride light-emitting diode die whose dominant wavelength emits blue light, but is not limited thereto. The light source 200 can also be a light-emitting diode or other types of light-emitting elements, such as a lamp tube, whose dominant wavelength emits other colors. The invention does not limit the type of the light source 200.

The first color conversion film 300 is configured to convert and adjust the color of the incident light L1. The first color conversion film 300 has, for example, a red-green light conversion material. When the light L1 emitted by the light source 200 is blue light, part of the light L1 is converted to red light and green light after passing through the first color conversion film 300, and the converted red light and green light are mixed with the part of the unconverted light L1 (blue light) to become white light. The foregoing is only an embodiment of the invention, and is not intended to limit the color of the light L1. The material of the first color conversion film 300 is, for example, quantum dot (QD), fluoride phosphor, oxynitride phosphor (KSF and (β-Sialon), YAG, etc., but not limited thereto. In another embodiment, when the light L1 provided by the light source 200 is white light, the first color conversion film 300 may not be provided and a diffuser may be used instead to improve the diffusion effect of the light L1.

Figure 2:
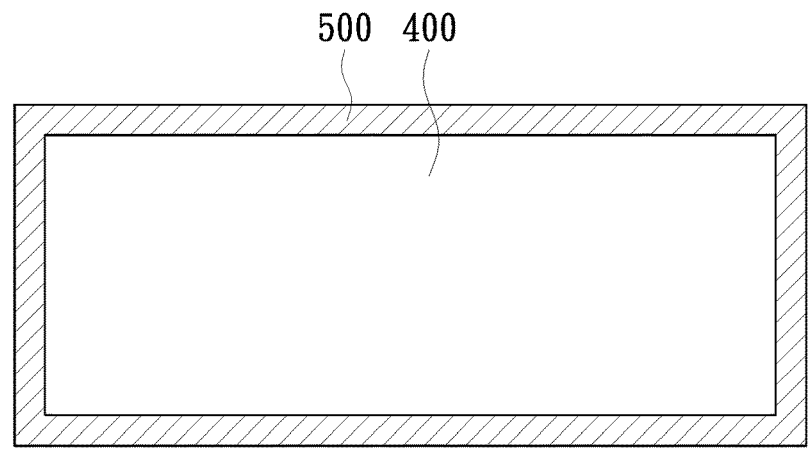
FIG. 2 is a schematic top view of the ink coating being disposed on an optical film in FIG. 1.

The at least one optical film 400 is, for example, a polarization enhancement film, a diffusion film, a prism sheet, or a multifunction film, but not limited thereto. The invention does not limit the number of the at least one optical film 400, that is, the number of the at least one optical film 400 can be one or more. In this embodiment, the at least one optical film 400 including three optical films 410, 420 and 430 is taken as an example. In addition, different types of optical films 410, 420 and 430 can also be selected respectively according to the function of the optical film. The optical films 410, 420 and 430 are sequentially stacked on the first color conversion film 300. In this embodiment, the ink coating 500 is disposed on the end surface of the at least one optical film 400. For example, the ink coating 500 may be disposed on the end surface of at least one of the optical films 410, 420 and 430. FIG. 2 is a schematic top view of the ink coating being disposed on an optical film in FIG. 1. As shown in FIG. 2, the ink coating 500 is disposed on the end surface of the periphery (four sides) of the at least one optical film 400 (e.g., the surface of the at least one optical film 400 that is non-parallel to the first light-emitting surface 110).

Please refer to FIG. 1 again. The at least one optical film 400 in this embodiment further includes, for example, a reflective sheet 440. The reflective sheet 440 is disposed beside the second light-emitting surface 120 of the light guide plate 100 and is configured to reflect the light L1 leaking from under the light guide plate 100 back to the light guide plate 100, thereby improving the light utilization efficiency. The ink coating 500 can also be disposed on the end surface of the reflective sheet 440 or the surface close to the light guide plate 100. Since the configuration of the ink coating 500 has been described above, no redundant detail is to be given herein.

The color of the ink coating 500 can be, for example, yellow or black, but is not limited thereto. For example, the first color conversion film 300 has a yellow light conversion material. That is, the color of the ink coating 500 can be yellow when the light L1 is blue. Therefore, part of the light leaking from the edge of the light guide plate 100 is converted to yellow light after passing through the first color conversion film 30. When the converted yellow light is transmitted to the yellow ink coating 500, the yellow ink coating 500 allows the converted yellow light to pass therethrough and reduce the transmission of non-yellow light. Thus, the light L1 transmitted to the edge of the light guide plate 100 (e.g., the light transmitted to the frame 30) is converted to the yellow light L2 (illustrated by the dashed line in FIG. 1). The yellow light L2 and the light L1 (blue light) leaking from the other edges (such as the gaps between the light guide plate 100 and other components) will cause the viewer to produce a color mixing effect, and the light emitted from the edge will be regarded as white light, thereby reducing the blue phenomenon of light leakage at the edge of the light source module 10. In addition, when a black ink coating 500 is selected, the concentration of the ink can be lowered to allow light to pass therethrough, which can cover part of the blue light L1 reflected at the edge and to reduce the blue phenomenon. In another embodiment, the color of the ink coating 500 can be, for example, black when the light L1 is white light, which functions as described above to reduce edge light leakage. The source light color and ink coating color used in this embodiment can be adjusted according to design requirements, and the invention is not limited thereto. In particular, in the invention, arranging the ink coating on the surface edge or end surface of the at least one optical film 400 can reduce the light emitted from the edge of the light source module 10 and further reduce the halo problem of brighter edges.

The first display panel 20 in this embodiment is, for example, a liquid crystal display panel. The type of the liquid crystal display panel is, for example, a transmissive display panel or a transflective display panel, but is not limited thereto.

Figure 3A:
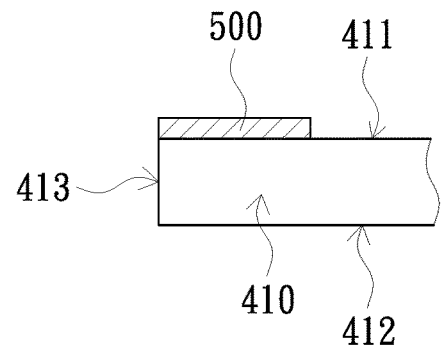
FIGS. 3A to 3C are schematic views of configurations in which an ink coating is disposed on an optical film according to different embodiments of the invention.
Figure 3B:
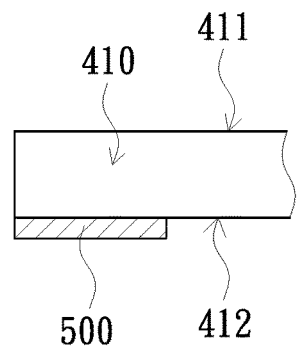
Figure 3C:
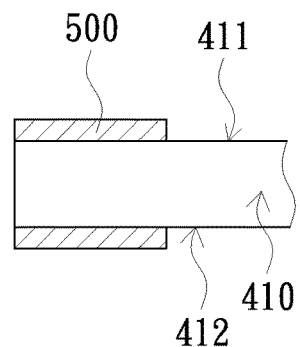

FIGS. 3A to 3C are schematic views of configurations in which an ink coating is disposed on an optical film according to different embodiments of the invention. Please refer to FIGS. 1 and 3A to 3C together. The difference between this embodiment and the embodiment of FIG. 1 is only the arrangement position of the ink coating 500. It should be noted that for clarity of presentation, FIGS. 3A to 3C only show the optical film 410 and the ink coating 500, and other components can be referred to FIG. 1. The optical film 410 has, for example, a first surface 411 and a second surface 412 opposite to each other. The first surface 411 is relatively away from the first light-emitting surface 110, and the second surface 412 faces the first light-emitting surface 110. The ink coating 500 is disposed by coating or spraying ink, for example. Specifically, the ink coating 500 may be disposed on the edge of the first surface 411 of the optical film 410 as shown in FIG. 3A, or may be disposed on the edge of the second surface 412 of the optical film 410 as shown in FIG. 3B, or may be disposed on the edges of the first surface 411 and the second surface 412 of the optical film 410 at the same time as shown in FIG. 3C, but the invention is not limited thereto. In other embodiments, the configuration of the ink coating 500 can be adjusted according to different design requirements. For example, the ink coating 500 may be disposed on the end surface 413 and the first surface 411 (or the second surface 412) of the optical film 410 at the same time, and the invention is not limited thereto. The configuration of the ink coating 500 can also be applied to the light guide plate 100 and the first color conversion film 300. In particular, the width of the ink coating 500 disposed on the surface edge can be adjusted according to different design requirements, and the invention is not particularly limited. The ink coating 500 disposed on the four edges of the optical film can have different widths according to different designs.

In the light source module 10 of the invention, the ink coating 500 allowing the light to pass therethrough is disposed on the surface edge or end surface of at least one of the light guide plate 100, the first color conversion film 300 and the at least one optical film 400. Thus, when the light L1 exits from the edge of the light guide plate 100, part of the light L1 is converted by the first color conversion film 300, is transmitted to the edge of the first color conversion film 300 or the at least one optical film 400, and then passes through the ink coating 500 to be converted into the light L2 of different colors. As such, the ink coating 500 can achieve the effect of lightening the blue light when the light source 200 emits blue light, thereby reducing the blue phenomenon of light leakage at the edge of the light source module 10. In addition, the closer the position of the ink coating 500 to the light guide plate 100 is, the better the lighting of blue light can be achieved. Since the display device 1 of this embodiment uses the above-mentioned light source module 10, the problem of blue phenomenon at the edges of the displayed image can be reduced.

Figure 4A:
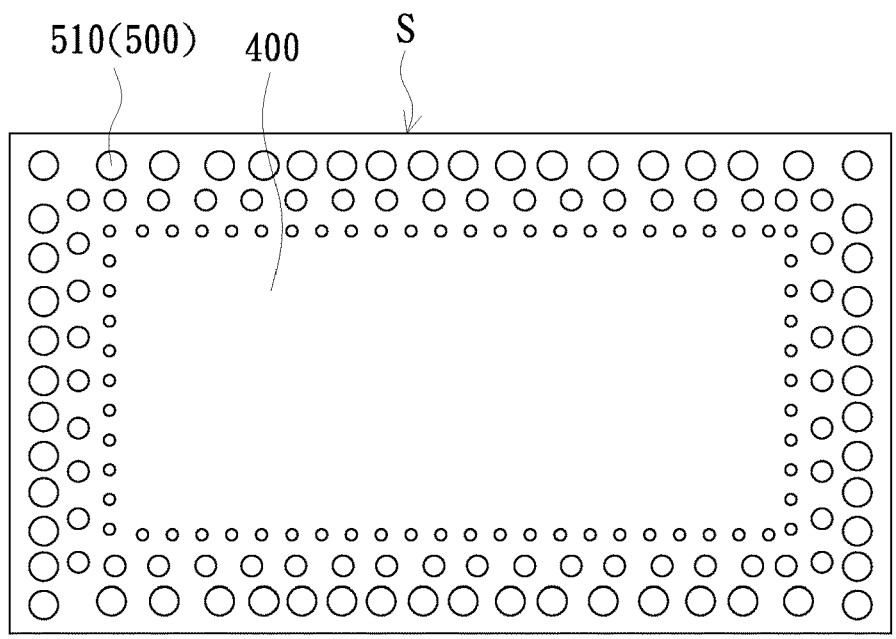
FIGS. 4A to 4D are schematic views of the configurations of an ink coating according to different embodiments of the invention.
Figure 4B:
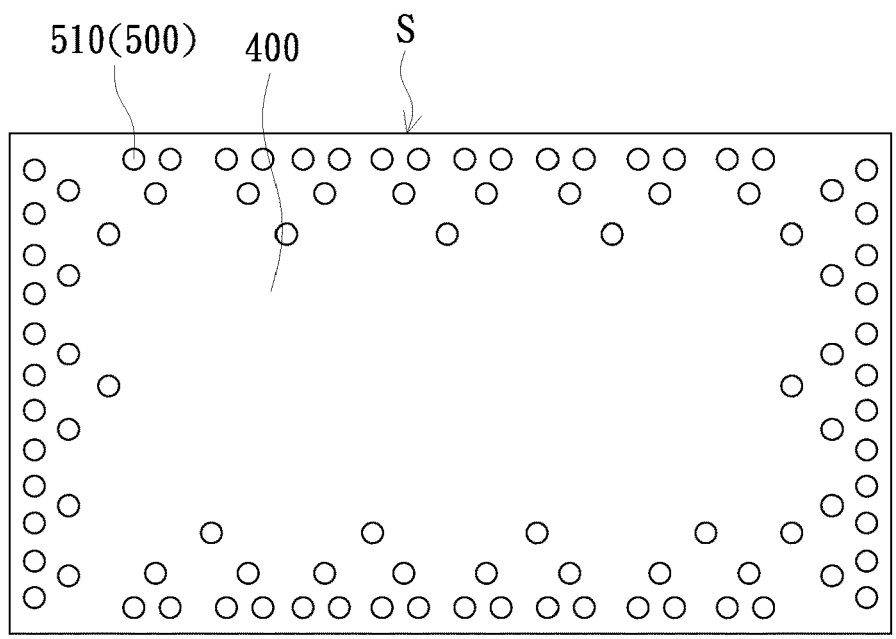

The ink coating 500 in the invention can also be designed in a gradual manner when being disposed. The ink coating 500 is mainly configured to reduce the blue phenomenon of light leakage at the edge of the light source module 10, thus the ink coating 500 can be designed to have the highest concentration at the edge and the concentration is gradually decreased in a direction away from the edge. FIGS. 4A to 4D are schematic views of the configurations of an ink coating according to different embodiments of the invention. Please refer to FIGS. 4A to 4D. The ink coating 500 in this embodiment can be disposed on the surface edge of at least one of the light guide plate 100, the first color conversion film 300 and the at least one optical film 400. The ink coating 500 in the embodiment is disposed on the surface edge of the at least one optical film 400 as an example. The ink coating 500 includes a plurality of ink dots 510, for example. In FIG. 4A, the size of the ink dots 510 gradually decreases from the edge S of the optical film 400 in a direction away from the edge S of the optical film 400, that is, gradually decreases from the edge S of the optical film 400 in a direction toward the center (not shown) of the optical film 400. In FIG. 4B, the sizes of the ink dots 510 are, for example, the same, but the distribution density of the ink dots 510 gradually decreases from the edge S of the optical film 400 in a direction away from the edge S of the optical film 400. In particular, the concentration of the plurality of ink dots 510 is, for example, the same, but the invention is not limited thereto. In other embodiments, the concentration of the plurality of ink materials 510 may gradually decrease from the edge S of the optical film 400 in a direction away from the edge S of the optical film 400.

Figure 4C:
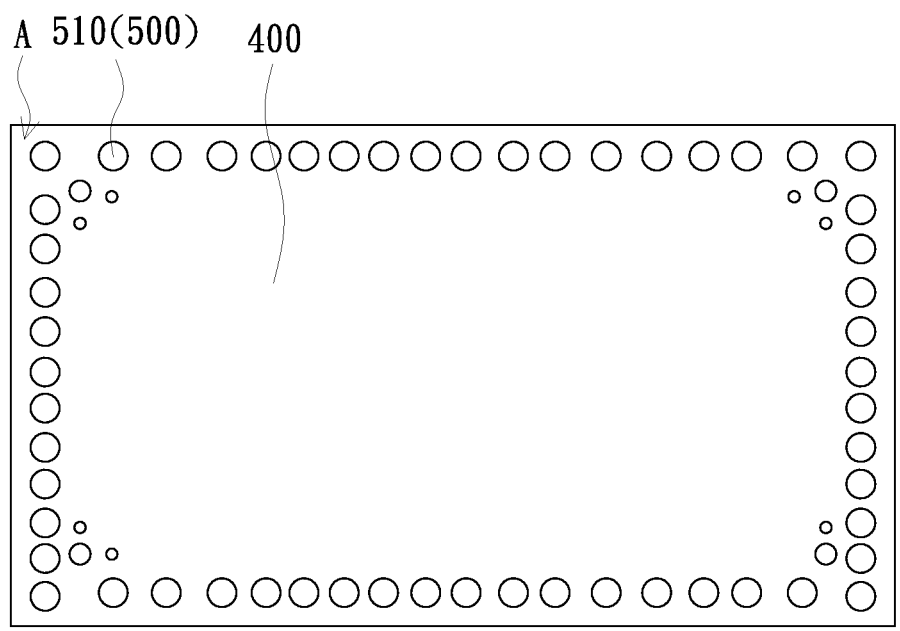
Figure 4D:
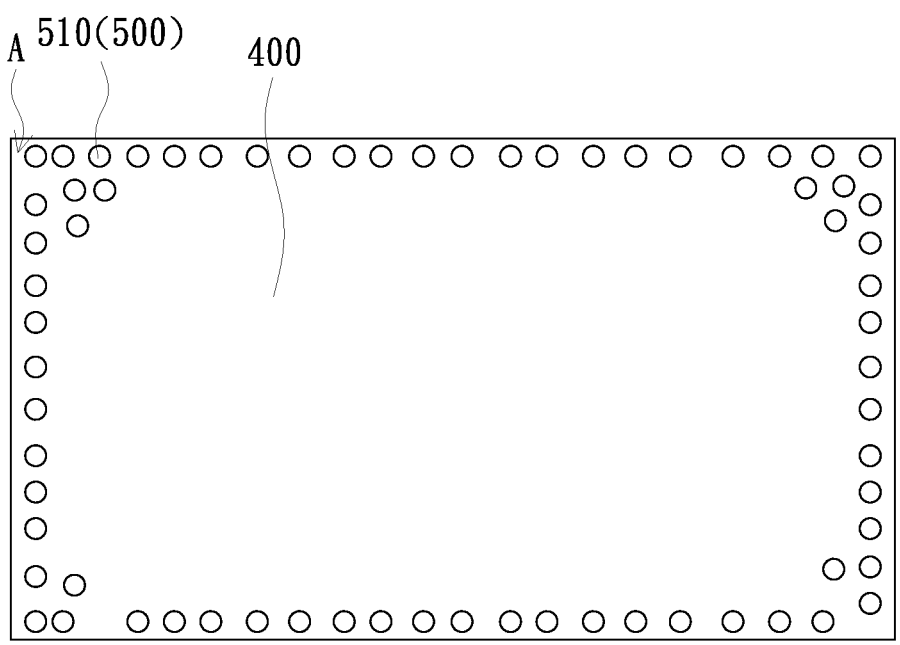

On the other hand, considering that the corners of the optical film 400 may have more serious light leakage and blue phenomenon, the configuration of the ink dots 510 can be reinforced at the corners. In FIGS. 4C and 4D, the distribution density of the ink dots 510 is the largest at the corner A of the edge, in which the size of the ink dots 510 gradually decreases from the corner A of the optical film 400 in a direction away from the corner A of the optical film 400 (as shown in FIG. 4C), or the distribution density of the ink dots 510 gradually decreases from the corner A of the optical film 400 in a direction away from the corner A of the optical film 400 (as shown in FIG. 4D). The above design is only an implementation of the invention, and is not intended to limit the configuration of the ink coating 500.

Figure 5:
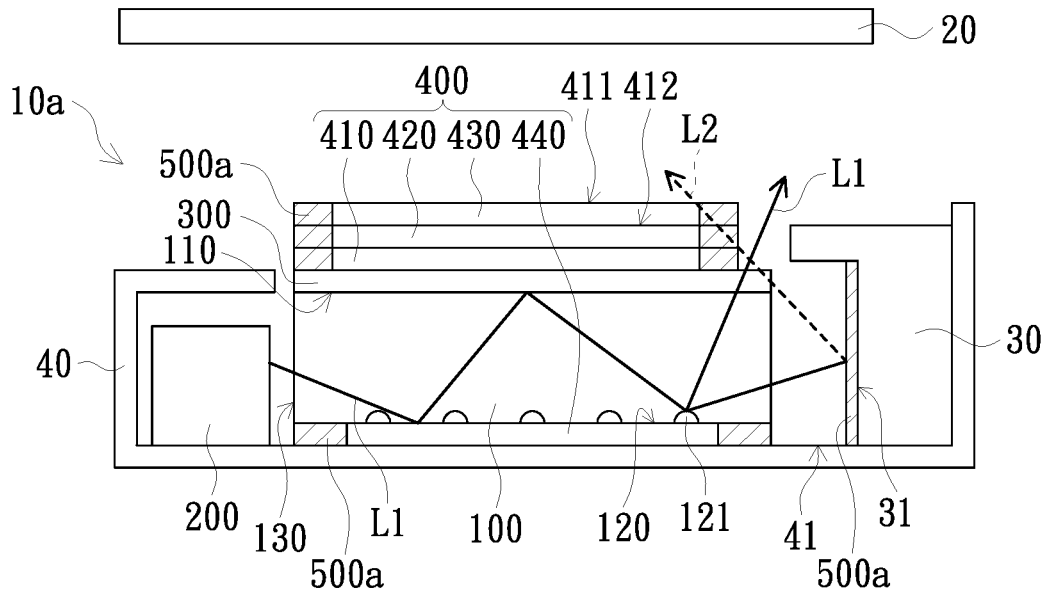
FIG. 5 is a schematic cross-sectional view of a display device according to another embodiment of the invention.

FIG. 5 is a schematic cross-sectional view of a display device according to another embodiment of the invention. Referring to FIG. 5, the structure and advantages of the display device 1a of this embodiment are similar to those of the above-mentioned display device 1. The only difference is that in the display device 1a of this embodiment, the frame 30 has a side surface 31 facing the light guide plate 100, and the ink coating 500a of the light source module 10a is further disposed on the side surface 31. Because the frame 30 can reflect the incident light back to the light guide plate 100, the first color conversion film 300, the at least one optical film 400, or to the first display panel 20, the ink coating 500a disposed on the frame 30 may be coated with ink or may be replaced with a tape suitable for reflecting light. In a preferred embodiment, the tape is a yellow or black tape, but is not limited thereto.

Figure 6:
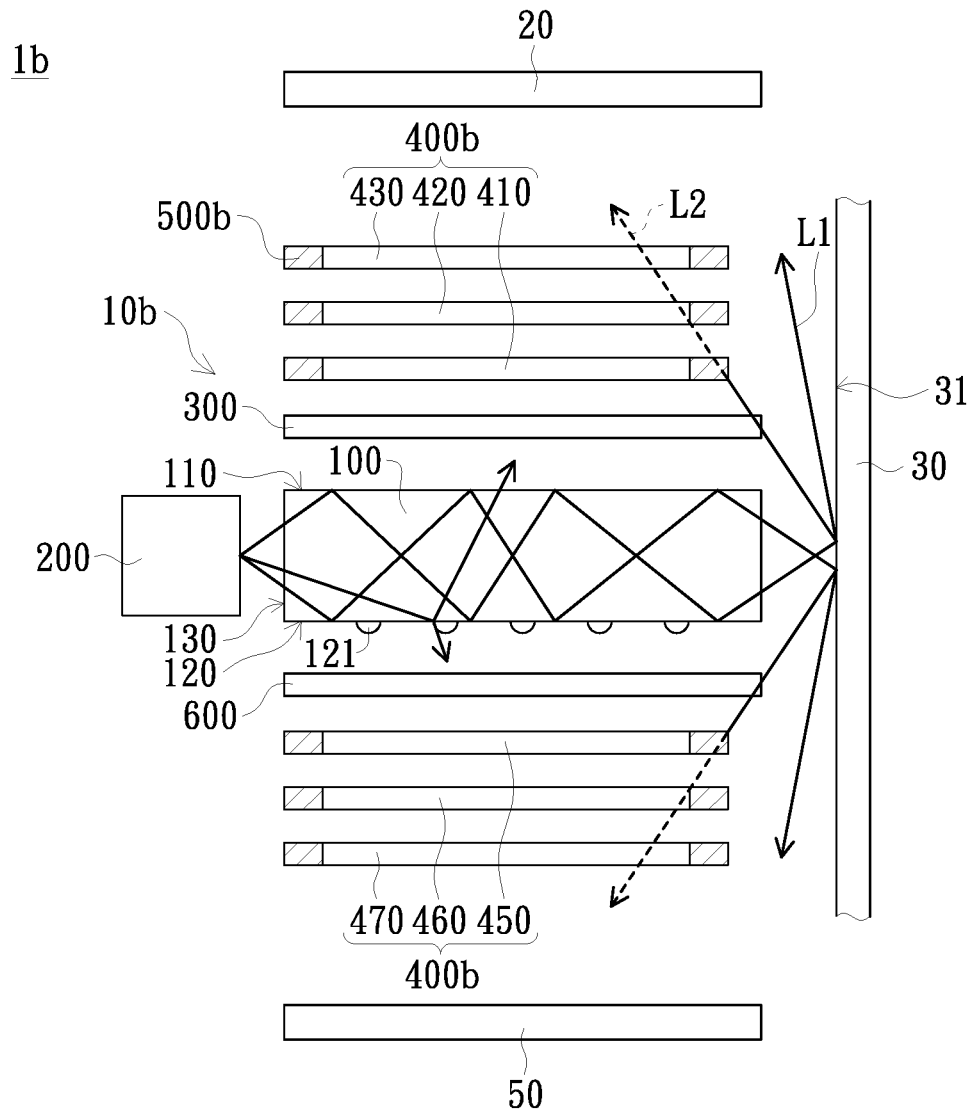
FIG. 6 is a schematic cross-sectional view of a display device according to another embodiment of the invention.

FIG. 6 is a schematic cross-sectional view of a display device according to another embodiment of the invention. Referring to FIG. 6, the structure and advantages of the display device 1b of this embodiment are similar to those of the above-mentioned display device 1, and only the main differences in structure will be described below. The display device 1b of this embodiment further includes a second display panel 50 and a second color conversion film 600. The second color conversion film 600 is disposed beside the second light-emitting surface 120. The second display panel 50 is disposed on the side of the second color conversion film 600 away from the light guide plate 100. Specifically, in the light source module 10b of this embodiment, when the light L1 is irradiated on the diffusing microstructure 121, part of the light L1 can be reflected or scattered and is emitted from the first light exit surface 110, and part of the light L1 can be refracted or scattered and is emitted from the second light-emitting surface 120, thereby achieving the effect of light emitting on both sides. The display device 1b is a dual-screen display device, and the second display panel 50 is, for example, a transmissive display panel or a transflective display panel. In this embodiment, the at least one optical film 400b further includes, for example, optical films 450, 460 and 470. The optical films 410, 420 and 430 are disposed beside the first light-emitting surface 110, the optical films 450, 460 and 470 are disposed beside the second light-emitting surface 120, and the second color conversion film 600 is disposed between the light guide plate 100 and the optical film 450, for example. The types and configurations of the optical films 450, 460 and 470 are similar to those of the optical films 410, 420 and 430, and no redundant detail is to be given herein.

The ink coating 500b is, for example, disposed on the surface edge or end surface of at least one of the light guide plate 100, the first color conversion film 300, the second color conversion film 600 and the at least one optical film 400b, but is not limited thereto. In this embodiment, the ink coating 500b is disposed on the at least one optical film 400b as an example. The ink coating 500b may also be disposed on the side surface 31 of the frame 30 as the display device 1a, for example. The advantages of the display device 1b of this embodiment are the same as those of the display device 1. Because the display device 1b is a dual-screen display device, the position of the ink coating 500b can be adjusted for the side of the first display panel 20 and the side of the second display panel 50 to meet different requirements.

In summary, in the light source module of the embodiment of the invention, an ink coating allowing light to pass therethrough is disposed on the surface edge or end surface of at least one of the light guide plate, the first color conversion film and the at least one optical film. Thus, when light exits from the edge of the light guide plate, part of the light is converted by the first color conversion film, is transmitted to the edge of the first color conversion film or the at least one optical film, and then passes through the ink coating to be converted into light of different colors. As such, the ink coating can achieve the effect of lightening the blue light when the light source emits blue light, thereby reducing the blue phenomenon of light leakage at the edge of the light source module. In addition, since the display device of the embodiment of the invention uses the above-mentioned light source module, the problem of blue edge of the displayed image can be reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first color conversion film, the second color conversion film, the first light-emitting surface, the second light-emitting surface, the first panel and the second panel are only used for distinguishing various elements and do not limit the number of the elements.

What is claimed is:

1. A light source module, comprising a light guide plate, a light source, a first color conversion film, at least one optical film and an ink coating, wherein:
    the light guide plate has a first light-emitting surface, a second light-emitting surface opposite to the first light-emitting surface, and a light-incident surface connected between the first light-emitting surface and the second light-emitting surface;
    the light source is disposed beside the light-incident surface;
    the first color conversion film is disposed beside the first light-emitting surface;
    the at least one optical film is disposed beside the light guide plate; and
    the ink coating is disposed on a surface edge of at least one of the light guide plate, the first color conversion film, and the at least one optical film, and is configured to allow light to pass therethrough;
    wherein the ink coating is disposed on the surface edge of at least one of the light guide plate, the first color conversion film, and the at least one optical film, the ink coating comprises a plurality of ink dots, and a size of the plurality of ink dots gradually decreases from a position close to the edge toward a direction away from the edge.

2. The light source module according to claim 1, further comprising a second color conversion film disposed beside the second light-emitting surface, wherein a number of the at least one optical film is plural, the plurality of optical films is respectively disposed beside the first light-emitting surface and the second light-emitting surface, and the ink coating is disposed on the surface edge of at least one of the light guide plate, the first color conversion film, the second color conversion film, and the at least one optical film.

3. The light source module according to claim 1, wherein the at least one optical film comprises a reflective sheet disposed beside the second light-emitting surface.

4. The light source module according to claim 1, wherein a color of the ink coating is yellow or black.

5. A light source module, comprising a light guide plate, a light source, a first color conversion film, at least one optical film and an ink coating, wherein:
    the light guide plate has a first light-emitting surface, a second light-emitting surface opposite to the first light-emitting surface, and a light-incident surface connected between the first light-emitting surface and the second light-emitting surface;
    the light source is disposed beside the light-incident surface;
    the first color conversion film is disposed beside the first light-emitting surface;
    the at least one optical film is disposed beside the light guide plate; and the ink coating is disposed on a surface edge of at least one of the light guide plate, the first color conversion film, and the at least one optical film, and is configured to allow light to pass therethrough;
    wherein the ink coating is disposed on the surface edge of at least one of the light guide plate, the first color conversion film, and the at least one optical film, the ink coating comprises a plurality of ink dots, and a distribution density of the plurality of ink dots gradually decreases from a position close to the edge toward a direction away from the edge.

6. A light source module, comprising a light guide plate, a light source, a first color conversion film, at least one optical film and an ink coating, wherein:
    the light guide plate has a first light-emitting surface, a second light-emitting surface opposite to the first light-emitting surface, and a light-incident surface connected between the first light-emitting surface and the second light-emitting surface;
    the light source is disposed beside the light-incident surface;
    the first color conversion film is disposed beside the first light-emitting surface;
    the at least one optical film is disposed beside the light guide plate; and the ink coating is disposed on a surface edge of at least one of the light guide plate, the first color conversion film, and the at least one optical film, and is configured to allow light to pass therethrough;
    wherein the ink coating is disposed on the surface edge of at least one of the light guide plate, the first color conversion film, and the at least one optical film, the ink coating comprises a plurality of ink dots, and a distribution density of the plurality of ink dots is maximum at corners of the edge.

7. A display device, comprising a light source module and a first display panel, wherein:
    the light source module comprises a light guide plate, a light source, a first color conversion film, at least one optical film and an ink coating, wherein:

the light guide plate has a first light-emitting surface, a second light-emitting surface opposite to the first light-emitting surface, and a light-incident surface connected between the first light-emitting surface and the second light-emitting surface;

the light source is disposed beside the light-incident surface;

the first color conversion film is disposed beside the first light-emitting surface;

the at least one optical film is disposed beside the light guide plate; and the ink coating is disposed on a surface edge of at least one of the light guide plate, the first color conversion film, and the at least one optical film, and is configured to allow light to pass therethrough; and the first display panel is disposed on a side of the first color conversion film away from the light guide plate;

wherein the ink coating is disposed on the surface edge of at least one of the light guide plate, the first color conversion film, and the at least one optical film, the ink coating comprises a plurality of ink dots, and a size of the plurality of ink dots gradually decreases from a position close to the edge toward a direction away from the edge.

8. The display device according to claim 7, further comprising a second display panel and a second color conversion film, wherein the second color conversion film is disposed beside the second light-emitting surface, the second display panel is disposed on a side of the second color conversion film away from the light guide plate, the first display panel is a transmissive display panel or a transflective display panel, and the second display panel is a transmissive display panel or a transflective display panel.

9. The display device according to claim 7, wherein the light source module further comprises a frame, the light guide plate is disposed in the frame, the frame has a side surface facing the light guide plate, and the ink coating is also disposed on the side surface.

* * * * *